United States Patent
Fujimoto

(10) Patent No.: US 8,533,521 B2
(45) Date of Patent: *Sep. 10, 2013

(54) METHOD FOR ADJUSTING PHASE OF A CLOCK IN A HOST BASED UPON COMPARISON OF FIRST AND SECOND PATTERN SIGNALS FROM A MEMORY AND THE FIRST AND THE SECOND PATTERN SIGNALS PRE-STORED IN THE HOST

(75) Inventor: Akihisa Fujimoto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,724

(22) Filed: Sep. 14, 2012

(65) Prior Publication Data

US 2013/0019119 A1    Jan. 17, 2013

Related U.S. Application Data

(63) Continuation of application No. 12/558,987, filed on Sep. 14, 2009, now Pat. No. 8,286,024.

(30) Foreign Application Priority Data

Dec. 26, 2008 (JP) ................................. 2008-334316

(51) Int. Cl.
*G06F 1/04* (2006.01)
*G06F 1/24* (2006.01)
*G06F 11/00* (2006.01)

(52) U.S. Cl.
USPC ........................................................ 713/503

(58) Field of Classification Search
USPC .................................................. 713/401, 503
See application file for complete search history.

(56) References Cited

U.S. PATENT DOCUMENTS

| | | | |
|---|---|---|---|
| 6,292,903 B1 * | 9/2001 | Coteus et al. | 713/401 |
| 6,553,505 B1 * | 4/2003 | Brown et al. | 713/401 |
| 6,654,897 B1 | 11/2003 | Dreps et al. | |
| 6,907,002 B2 | 6/2005 | Beshai et al. | |
| 2004/0064750 A1 | 4/2004 | Conway | |
| 2007/0136621 A1 | 6/2007 | Alon et al. | |
| 2008/0077350 A1 | 3/2008 | Reichert | |
| 2008/0098142 A1 | 4/2008 | Fujimoto | |
| 2008/0201597 A1 * | 8/2008 | Chong et al. | 713/401 |

FOREIGN PATENT DOCUMENTS

JP    2008-90556    4/2008

* cited by examiner

*Primary Examiner* — Thomas Lee
*Assistant Examiner* — Xuxing Chen
(74) *Attorney, Agent, or Firm* — Oblon, Spivak, McClelland, Maier & Neustadt, L.L.P.

(57) ABSTRACT

A memory card includes a memory controller configured to perform control for sending and receiving a command signal, a response signal, a data signal, and a status signal in synchronization with a clock signal, and a memory-side pattern signal storage unit configured to store a tuning pattern signal to be sent to a host device. The tuning pattern signal is used by the host device to adjust the phase of the clock signal for use as a sampling clock signal. The memory card sends a first tuning pattern signal through a command line and a second tuning pattern signal through a data line concurrently.

15 Claims, 14 Drawing Sheets

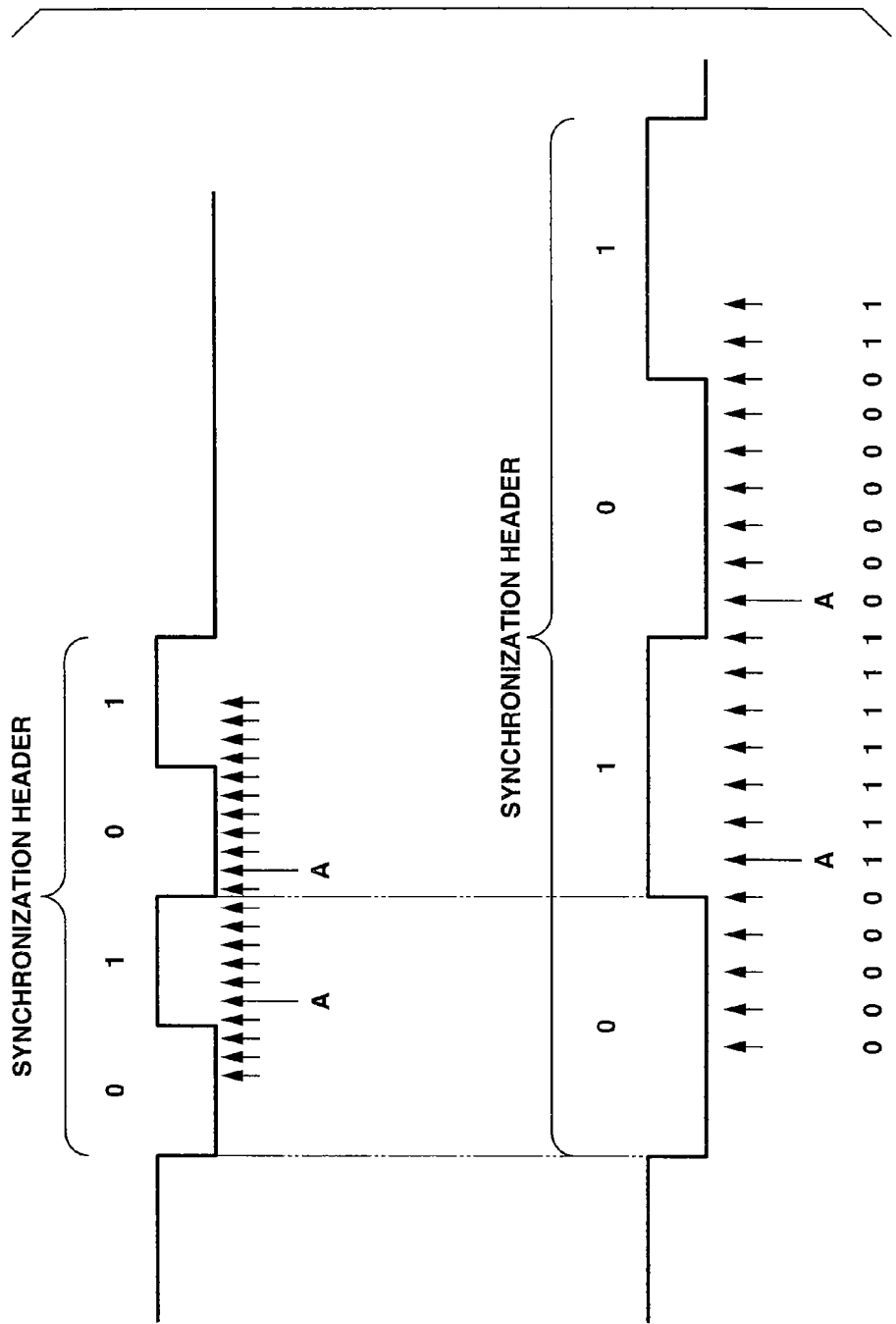

METHOD FOR ADJUSTING PHASE OF A CLOCK IN A HOST BASED UPON COMPARISON OF FIRST AND SECOND PATTERN SIGNALS FROM A MEMORY AND THE FIRST AND THE SECOND PATTERN SIGNALS PRE-STORED IN THE HOST

This application is a continuation of U.S. application Ser. No. 12/558,987 filed Sep. 14, 2009, and claims the benefit of Japanese Application No. 2008-334316 filed in Japan on Dec., 26, 2008, the contents of each of which are incorporated herein by this reference.

BACKGROUND OF THE INVENTION

1. Field of the Invention

The present invention relates to a memory device having a semiconductor memory unit, a host device connecting with the memory device, and a method for adjusting a sampling clock of the host device and, in particular, to the memory device connecting to a host device configured to adjust a sampling clock.

2. Description of the Related Art

Memory devices including a semiconductor memory unit, for example memory cards that include a non-volatile semiconductor memory unit have been developed in recent years and are widely used as external storage devices for information apparatuses such as digital cameras, which are host devices to which the memory cards are connected. So-called embedded memory systems in which a memory device is incorporated into a host device also have found wide applications.

In a memory system consisting of a memory device and a host device, the host device and the memory device send and receive a clock signal to and from each other through a clock line, a command signal and a response signal through a command line, and a data signal and a status signal through a data line.

When the host device reads data from the memory device, the host device sends a clock signal to the memory device through the clock line, the memory device outputs the data in synchronization with the clock signal provided from the host device, and then the host device takes the data signal in synchronization with the clock signal.

There is a demand for higher data transfer rates between host and memory devices, that is, higher write speeds and the readout speeds. However, as the transfer rate increases, that is, as the frequency of a clock signal increases, the effect of the read delay time between the output of the clock signal from the host device and the input of data to the host device becomes more noticeable. Consequently, it becomes difficult for the host device, which is in synchronization with the clock signal it sent, to take data in an accurate timing.

Therefore, for example Japanese Patent Application Laid-Open Publication No. 2008-90556 discloses a memory card that is accessed by a host apparatus in which a clock input circuit receives a first clock signal from the host apparatus through a clock line, a data input-output circuit receives a second clock signal from the host apparatus through a data line in a write timing adjustment mode and sends a third clock signal in a read timing adjustment mode.

BRIEF SUMMARY OF THE INVENTION

According to one aspect of the present invention, there is provided a memory device including: a nonvolatile semiconductor memory unit; a memory controller configured to perform control for sending and receiving a command signal, a response signal, a data signal, and a status signal in synchronization with a clock signal when the memory controller controls sending and receiving of the command signal and the response signal through a command line to and from a host device to which the memory device is connected, sending and receiving of the data signal and the status signal through a data line to and from the host device, and receiving of a clock signal through a clock line from the host device; and a memory-side pattern signal storage unit configured to store a tuning pattern signal to be sent to the host device, the tuning pattern signal being used by the host device to adjust a phase of the clock signal for use as a sampling clock signal.

According to another aspect of the present invention, there is provided a host device including: a clock configured to generate a clock signal; a host controller configured to perform control for sending a command signal and a data signal in synchronization with the clock signal to a memory device having a nonvolatile semiconductor memory unit and being connected to the host device and for receiving from the memory device a response signal, a data signal, and a status signal in synchronization with a sampling clock signal, the sampling clock signal being the clock signal whose phase is adjusted, when the host controller controls sending and receiving of the command signal and the response signal through a command line, sending and receiving of the data signal through a data line, receiving of the status signal through a data line, and sending of the clock signal through a clock line; a sampling clock adjustment unit configured to adjust a phase of the sampling clock signal; and a host-side pattern signal storage unit configured to pre-store a tuning pattern signal having the same pattern as a tuning pattern signal sent from the memory device for adjusting the phase of the sampling clock signal.

According to yet another aspect of the present invention, there is provided a sampling clock adjusting method for a host device connected to a memory device including a nonvolatile semiconductor memory unit and configured to send and receive a command signal and a response signal to and from the memory device through a command line, send and receive a data signal to and from the memory device through a data line, receive a status signal through a data line from the memory device, and send a clock signal to the memory device through a clock line, the method including: setting a sampling clock signal determining a sampling point at which the host device receives the data signal from the memory device in order to set an initial value of the phase of the sampling clock signal; sending from the host device to the memory device a tuning command for adjusting the phase of the sampling clock signal from the clock signal through the command line; receiving, by the host device, a first tuning pattern signal as a response signal sent through the command line from the memory device in response to the tuning command; and adjusting, by the host device, the sampling clock signal on the basis of the received first tuning pattern signal.

BRIEF DESCRIPTION OF THE DRAWINGS

FIGS. 15A and 15B are diagrams for explaining how oversampling is performed in the memory card according to the second embodiment when a clock frequency is changed.

DETAILED DESCRIPTION OF THE INVENTION

First Embodiment

A memory card 1, a host device 2, and a method for adjusting a sampling clock of the host device 2 according to a first embodiment of the present invention will be described with reference to drawings.

Figure 1:
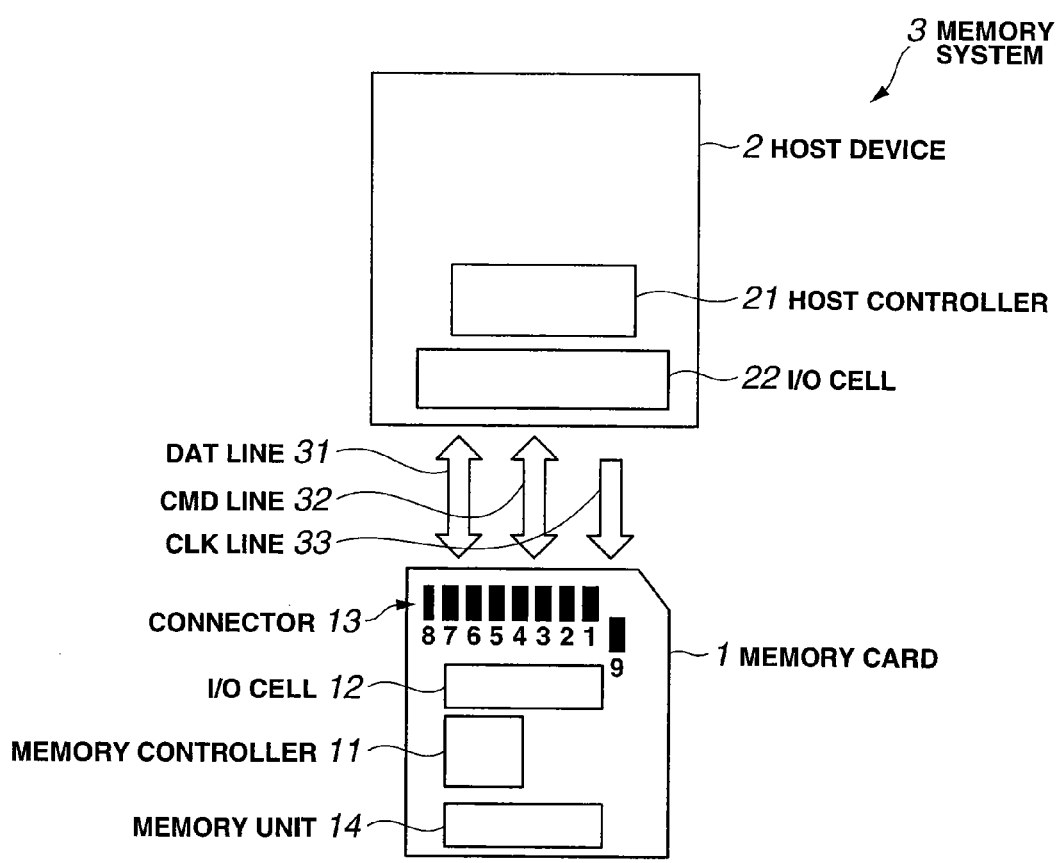
FIG. 1 illustrates a general configuration of a memory system including a memory card and a host device according to a first embodiment.

The memory card 1 of the first embodiment illustrated in FIG. 1 is an SD memory card (registered trademark) that is connectable to the host device 2 and is connected to the host device 2 for use as an external storage device for the host device 2. Examples of the host device 2 include information processing apparatuses such as personal computers that process various kinds of data such as image data and music data and digital cameras.

The memory card 1 includes a memory unit 14 which is a nonvolatile memory, a memory controller 11 configured to control the memory unit 14 and control sending and receiving of transmission signals, an I/O cell array 12 which has a command (abbreviated as "CMD" in the drawings) line 32 for inputting and outputting data, a clock (abbreviated as "CLK" in the drawings) line 33 and a data (abbreviated as "DAT" in the drawings) line 31, and a connector 13 (including pins 1 to 9).

The host device 2 includes an I/O cell array 22 having a command line 32, a clock line 33, and a data line 31 for sending and receiving signals to and from the memory card 1 connected to the host device 2 and a host controller 21 configured to control sending and receiving of transmission signals.

When the memory card 1 is attached to the host device 2, the connector 13 is electrically connected to the host device 2 through signal lines. More exactly, the signal lines such as command lines include host device's signal lines and memory card's signal lines. Assignment of the signal lines to the pins 1 to 9 contained in the connector 13 is specified in an SD memory card (registered trademark) standard.

For example, four data lines DAT0, DAT1, DAT2, and DAT3 for sending and receiving data signals are assigned to pins 7, 8, 9, and 1, respectively. Pin 1 is also assigned to a card detection signal CD. A command signal and a response signal (abbreviated as "RES" in the drawings) which is a response of the memory card 1 to the command signal are assigned to pin 2. A clock signal is assigned to pin 5. A supply voltage VDD is assigned to pin 4, a ground voltage VSS1 is assigned to pin 3, and another ground voltage VSS2 is assigned to pin 6.

For simplicity, an example will be described in which only one data line is used. Command signals and response signals are sent and received through the command line, data signals and status signals (referred to as "STATUS" in the drawings) are sent and received through the data line, and clock signals are sent and received through the clock line. Here, the command signals are signals that transmit commands which are instructions from the host device 2 to the memory card 1. The response signals and the status signals are signals sent from the memory card 1 to the host device 2 in response to the command signals. The timings of sending and receiving the command signals, the response signals, the data signals, and the status signals are determined on the basis of the clock signal.

Figure 2:
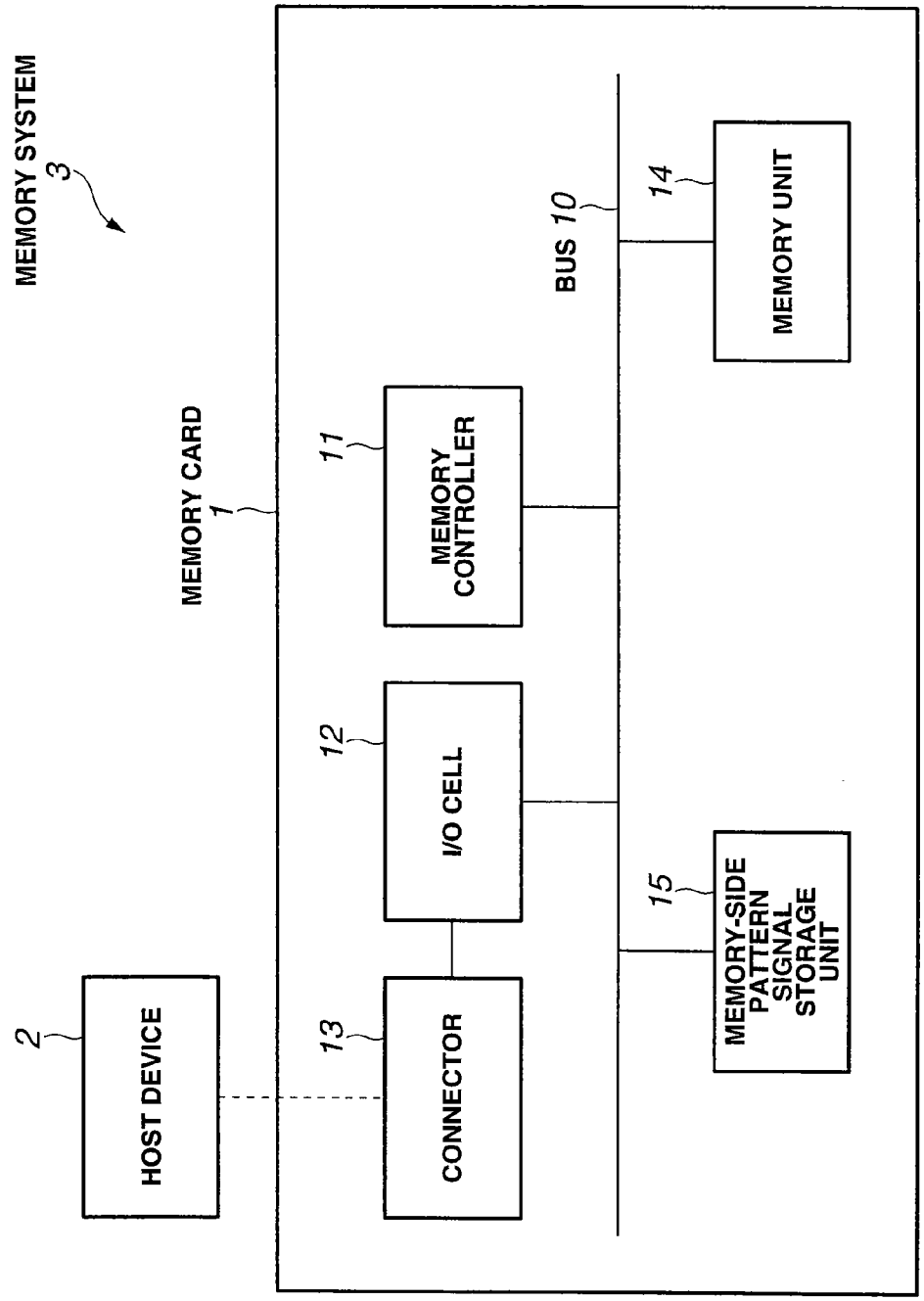
FIG. 2 is a block diagram illustrating a configuration of the memory card according to the first embodiment.

A configuration of the memory card 1 will be described below with reference to FIG. 2. The memory card 1 according to the present embodiment includes, in addition to the components described above, a memory-side pattern signal storage unit 15 which is connected to the other components through a bus 10 and configured to store a tuning pattern signal. The memory-side pattern signal storage unit 15 may be a part of the memory controller 11 rather than a separate component. The tuning pattern signal is used by the host device 2 for adjusting the phase of the clock signal for use as a sampling clock signal and is also used for detecting interference between signal lines in the memory system 3 of the present embodiment, which will be detailed later.

The memory unit 14 of the memory card 1 of the present embodiment is a nonvolatile semiconductor memory and is implemented by a NAND flash memory. Data sent from the host device 2 is stored in the memory unit 14.

Figure 3:
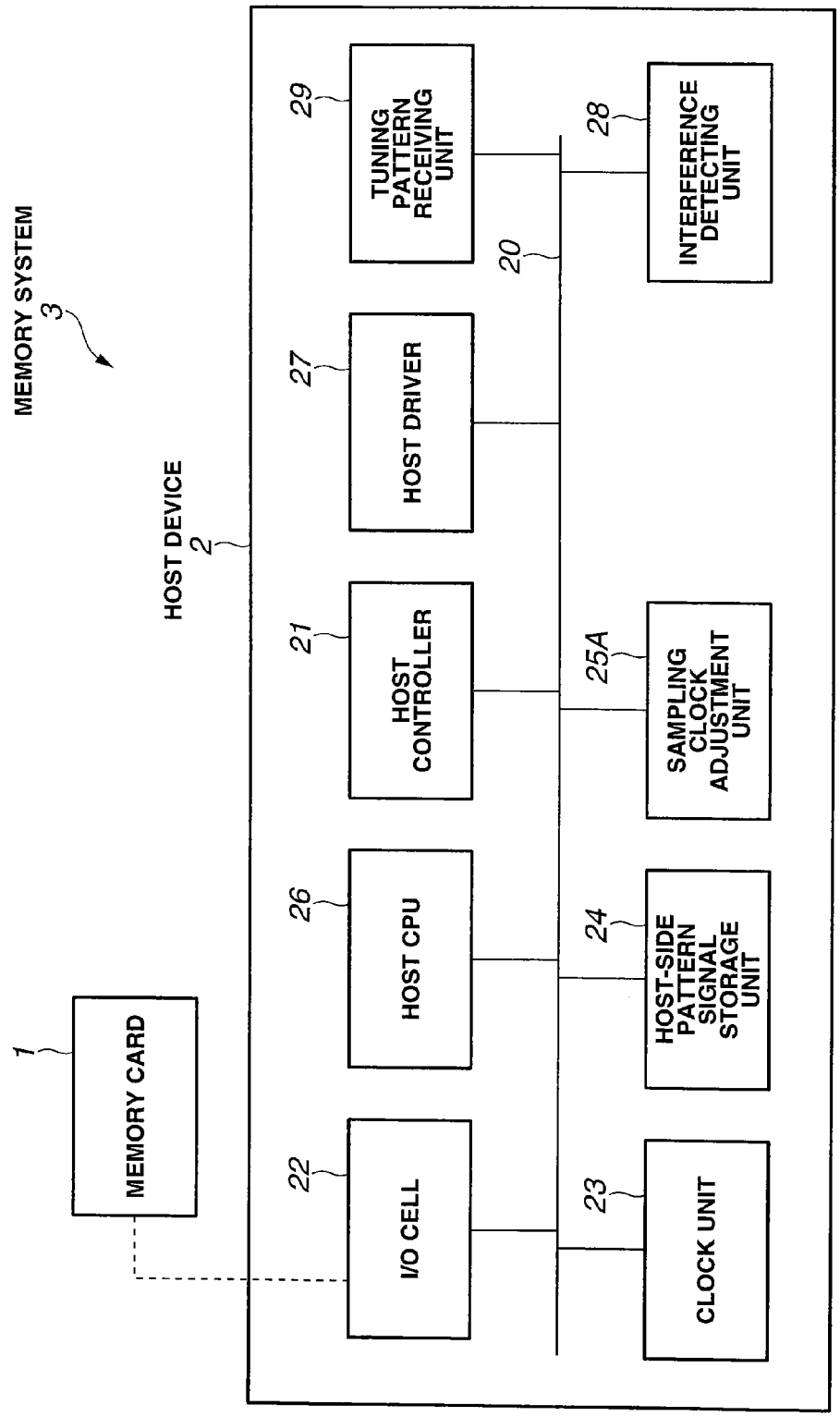
FIG. 3 is a block diagram illustrating a configuration of the host device according to the first embodiment.

A configuration of the host device 2 will be described with reference to FIG. 3. The host device 2 according to the present embodiment includes, in addition to the components described above, a host CPU 26, a host driver 27, a clock 23, a host-side pattern signal storage unit 24, a sampling clock adjustment unit 25, an interference detecting unit 28, and a tuning pattern receiving unit 29, which are interconnected through a bus 20.

The host-side pattern signal storage unit 24 is an internal block of a system memory, not shown. The interference detecting unit 28 is a function of a program executed by the host CPU 26. While the sampling clock adjustment unit 25A and the tuning pattern receiving unit 29 are internal blocks of the host controller 21, they are illustrated as separate components for purposes of illustration.

The clock 23 supplies a clock signal which provides a reference frequency for operation of the memory system 3. The clock signal frequency can be switched between 25 MHz and 50 MHz, for example. The host-side pattern signal storage unit 24 stores a tuning pattern signal that has the same pattern as that in the memory-side pattern signal storage unit 15. The sampling clock adjustment unit 25 uses the tuning pattern signal to adjust the phase of the clock signal for use as a sampling clock signal. The host CPU 26, or, in other words, the interference detecting unit 28 reads a tuning pattern received by the tuning pattern receiving unit 29 and compares the tuning pattern with the tuning pattern in the host-side pattern signal storage unit 24 on the system memory to detect interference between signal lines, for example a transmission error due to a crosstalk between the command line and the data line. Lines between which an error has occurred can be identified from the location where a mismatch between the tuning patterns occurs.

Figure 4:
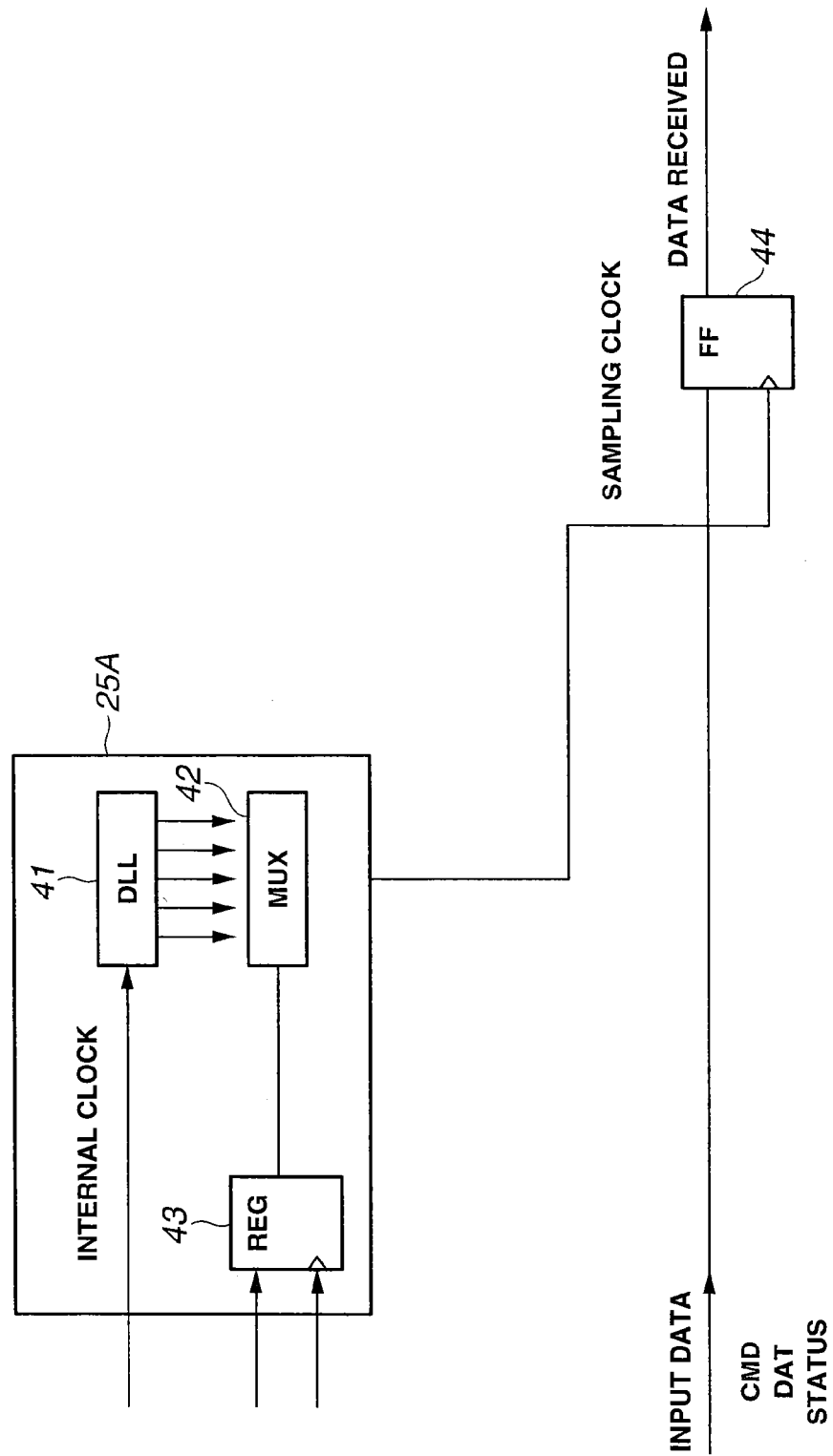
FIG. 4 is a block diagram illustrating a configuration of a sampling clock adjustment unit of the host device according to the first embodiment.

As shown in FIG. 4, the sampling clock adjustment unit 25A includes a Delay Locked Loop (DLL) 41, a multiplexer 42, and a register 43. The DLL 41 has a plurality of taps that are out of phase with one another and adjusts the phase of a clock signal input from the clock 23, or, in other words, generates a sampling clock that is out of phase with the clock signal by a certain degree. The multiplexer 42 selects one of the plurality of phase taps of the DLL 41. The register 43 stores the phase tap position selected by the multiplexer 42.

Figure 5:
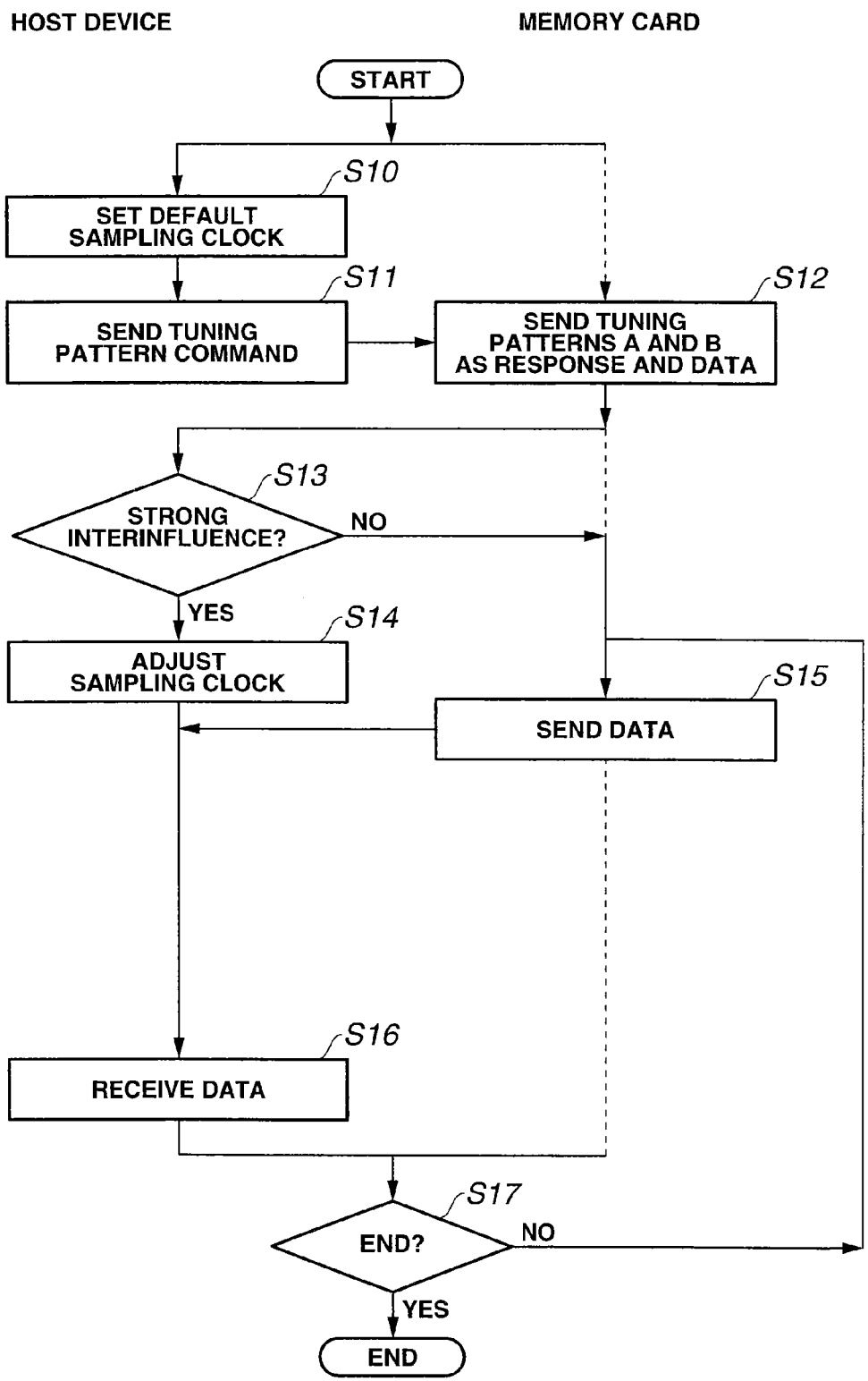
FIG. 5 is a flowchart illustrating a process flow of a sampling clock adjusting method according to the first embodiment.
Figure 6:
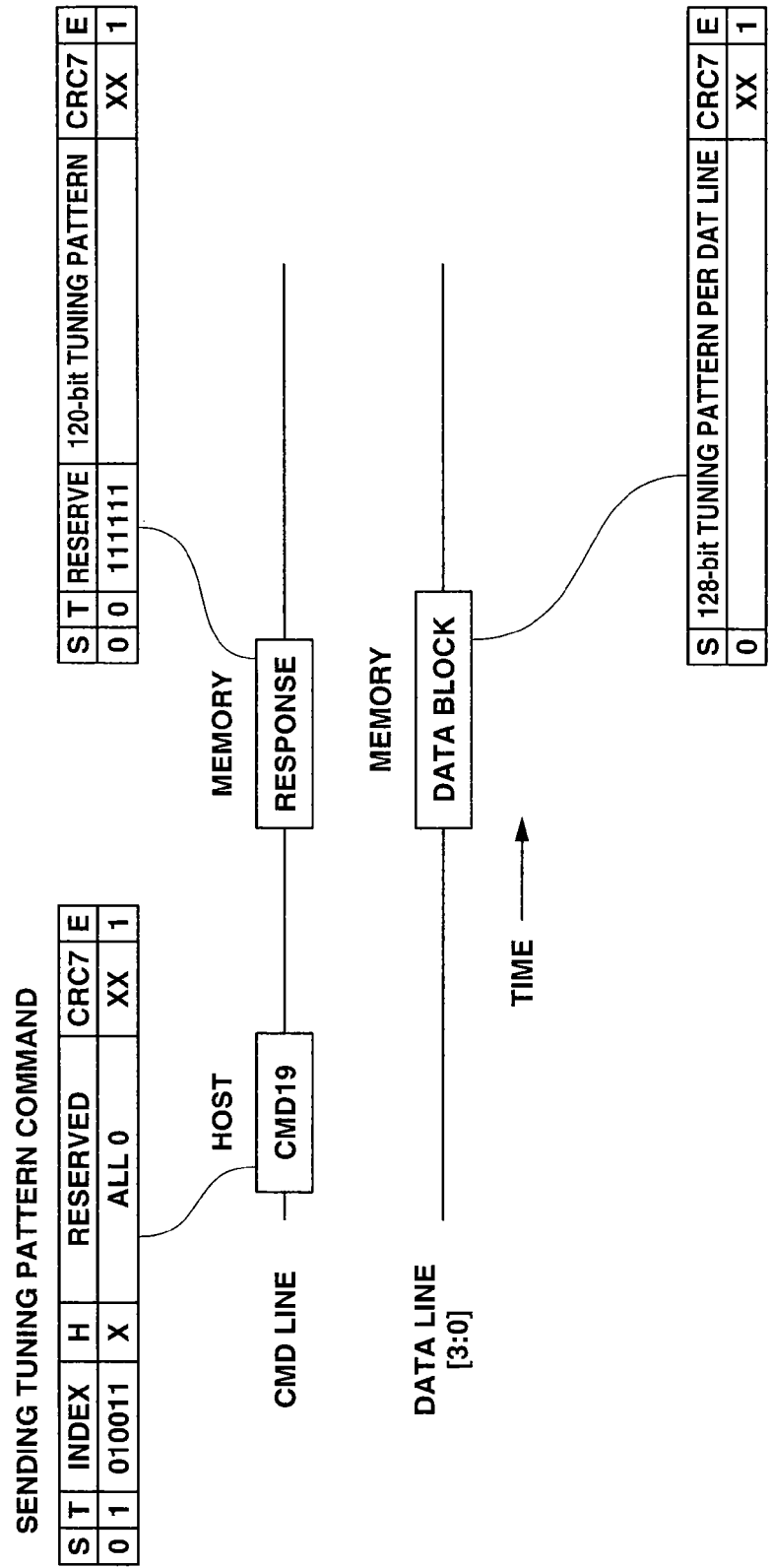
FIG. 6 is a timing chart illustrating the sampling clock adjusting method according to the first embodiment.

The memory card 1, which is a memory device according to the first embodiment of the present invention, a host device 2, and a method for adjusting a sampling clock of the host device 2 will be described with reference to FIGS. 5 and 6. FIG. 5 is a flowchart illustrating a process flow of a sampling clock adjusting method according to the first embodiment of the present invention. FIG. 6 is a timing chart of the sampling clock adjusting method according to the first embodiment of the present invention. While a tuning pattern command in FIG. 6 is an example to which a synchronization header signal parameter H, which will be described with respect to a second embodiment, is added, a command without the parameter H may be used. The parameter H is a command argument that turns on and off a header.

A buffer having a size large enough to successively receive long data is provided beforehand in the host device 2. Too small a buffer size will suspend data transfer and the suspension time can shift data transfer timing and cause a sampling error.

The process will be described with respect to the flowchart of FIG. 5.

<Step S10> Sampling Clock Signal Setting Step

When the memory card 1 is connected to the host device 2, the host device 2 acquires basic information about the memory card 1, such as the capacity, supported transfer rate, and operating voltage of the memory card 1, from the memory card 1 through the use of a command signal and a response signal. The host device 2 sets an initial value of the phase of a sampling clock signal by adjusting the phase of the clock signal on the basis of information such as the transfer rate supported by the memory card 1. That is, the host device 2 selects one of the plurality of phase taps of the DLL 41 and stores the phase tap position in the register 43. The initial value of the phase of the sampling clock signal may be zero, that is, the same as that of the clock signal. Sending and receiving of signals by the host device 2 is controlled by the host controller 21.

<Step S11> Tuning Command Sending Step

The host device 2 sends a tuning command, which is a command to read out a tuning pattern, to the memory card 1 through the command line. As shown in FIG. 6, the tuning command includes a data string that meets a specification defined in the standard of the memory card.

<Step S12> Tuning Pattern Signal Sending Step

When the memory card 1 receives the tuning command, the memory card 1 sends a first tuning pattern signal as a response signal through the command line. Then, the memory card 1 of the present embodiment sends to the host device a second tuning pattern signal as data through the data line in a time period that overlaps the time period of the transmission of the first tuning pattern signal. That is, the time period during which the first tuning pattern signal is being transmitted through the command line and the time period during which the second tuning pattern signal is being transmitted through the data line at least partially overlap each other. The first and second tuning pattern signals are sent at the same time or there is an overlapping period between the first and second signals.

Every single data line has a tuning pattern unique to the data line. For example, if there are four data lines, the memory controller 11 sends tuning pattern signals by which interference between the command line and each of the four data lines can be detected, in time periods that overlap each other so that the interference detecting unit 28 can detect an effect of interference between any two lines.

The first and second tuning pattern signals are prestored in the memory-side pattern signal storage unit 15. The tuning pattern signals meet a specification defined in the standard of the memory card. Unlike an ordinary response, the tuning pattern signals are long responses, nearly as long as the data length, as illustrated in FIG. 6. An example of a long response is the R2 response defined in the specifications for an SD memory card (registered trademark). For example, the first tuning pattern signal is a 120-bit data string and the second tuning pattern signal is a 128-bit data string.

The second tuning pattern signal has a certain checking pattern that is especially prone to interfere with another signal, so that an effect of interference with the first tuning pattern signal can be detected. For example, if the first tuning pattern signal includes a sequence of 0s, the second tuning pattern signal includes repetitions of 01. Of course, one tuning pattern signal may include various patterns rather than repetitions of the same pattern because signal patterns that are prone to crosstalk vary depending on transmission conditions and other conditions.

The tuning pattern signals may be predetermined patterns defined in a standard and may be stored in the memory-side pattern signal storage unit 15 or the host-side pattern signal storage unit 24 at the time of manufacture of the memory card 1 or the host device 2. Alternatively, the tuning pattern signals may be sent from the host-side pattern signal storage unit 24 of the host device 2 to the memory card 1 and stored in the memory-side pattern signal storage unit 15 when the memory card 1 is connected to the host device 2. In the latter case, tuning pattern signals that vary according to the type of the memory system can be used.

In the memory system 3, a plurality of tuning pattern signal sets, each consisting of first and second tuning pattern signals, may be used. One of the tuning pattern signal sets that is most suitable for each transmission environment may be selected. That is, each of the host-side pattern signal storage unit 24 and the memory-side pattern signal storage unit 15 may store a plurality of tuning pattern signal sets and the host controller 21 may send the command described above with an argument that indicates which of the tuning pattern signal sets is to be used.

<Tuning Pattern Signal Receiving Step>

The host device 2 receives the first tuning pattern signal through the command line and the second tuning pattern signal through the data line. There is an overlapping period between the first and second tuning pattern signals.

<Interference Detecting Step>

The interference detecting unit 28 of the host device 2 reads out from the tuning pattern receiving unit 29 the first and second tuning pattern signals received from the memory card 1. The interference detecting unit 28 compares the first and second tuning pattern signals with the first and second tuning pattern signals prestored in the host-side pattern signal storage unit 24 to detect a condition indicating interference between the command line and the data line.

That is, the host CPU 26, which also functions as the interference detecting unit 28, compares by host software the received first tuning pattern signal with the first tuning pattern signal stored in the host-side pattern signal storage unit 24 to detect whether there is a difference, that is, an error, and also compares the received second tuning pattern signal with the second tuning pattern signal stored in the host-side pattern signal storage unit 24 to detect whether there is a difference, that is, an error.

<Step S14> Sampling Clock Adjusting Step

When the interference detecting unit 28 in the host device 2 detects an interference, i.e., an error, (Yes at S13), the sampling clock adjustment unit 25 adjusts sampling points, i.e., the phase of the sampling clock, to determine optimum input sampling points to prevent interference that can cause a transmission error. In particular, the multiplexer 42 of the sampling clock adjustment unit 25 switches from one of the phase taps of the DLL 41 to another.

The optimum sampling position, which is the center of data, can be detected by any of several methods. A first method is to detect a clock position that makes a sample central, from the result of oversampling. This method requires dedicated hardware but is fast. A second method is to read the tuning patterns while selecting taps in sequence starting from the one that provides the smallest delay to the one that provides the largest delay to detect a minimum delay position, that is, a minimum delay phase at which all the patterns can be read without an error. Alternatively, the tuning patterns are read while selecting taps in sequence starting from the one that provides the largest delay to the one that provides the smallest delay to detect a maximum delay position at which all the patterns can be read without an error. In the second method, the midpoint between the minimum and maximum delay positions is set as the optimum sampling point and therefore control by firmware is possible.

When the interference detecting unit 28 detects interference, the host device 2 may reduce the clock frequency to a value within a range supported by the memory card 1 or change other transmission conditions.

<Steps S15 and S16> Data Sending and Receiving Steps

The memory card 1 starts data transmission and the host device 2 receives the data. The adjusted sampling clock is also used for determining sampling timing for reception of a command signal and a response signal through the command line and reception of a status signal through the data line as well as reception of the data through the data line.

The data transmission is continued until transmission is ended by, for example, removing the memory card 1 from the host device 2.

As has been described above, the memory card 1 of the present embodiment sends tuning pattern signals stored in the memory-side pattern signal storage unit 15 to the host device 2 in response to a tuning pattern command. Therefore, the host device 2 can identify a more appropriate sampling point for receiving a signal. In addition, the memory card 1 outputs the first tuning pattern signal which is a response pattern signal and the second tuning pattern signal which is a data pattern signal at the same time to enable the host device 2 to check to determine whether there is the effect of interference between the command line and each data line to identify a more appropriate sampling position, that is, to adjust the phase of the sampling clock signal. Therefore, fast transmission can be performed between the memory card 1 and the host device 2.

While the present embodiment has been described with respect to a memory system 3 including an SD memory card (registered trademark) as a memory device, the present embodiment is also applicable to any memory system including other type of memory card, memory device, or internal memory that uses a data transfer system similar to the SD memory card, and can achieve the same advantageous effects as the memory system 3.

Second Embodiment

A memory card 1A which is a memory device, a host device 2A, and a method for adjusting a sampling clock of the host device 2A according to a second embodiment of the present invention will be described with reference to drawings. The memory card 1A and the host device 2A of the second embodiment are similar to the memory card 1 and the host device 2 of the first embodiment. Therefore the same components as those of the first embodiment will be labeled the same reference numerals and the description of which will be omitted.

Figure 7:
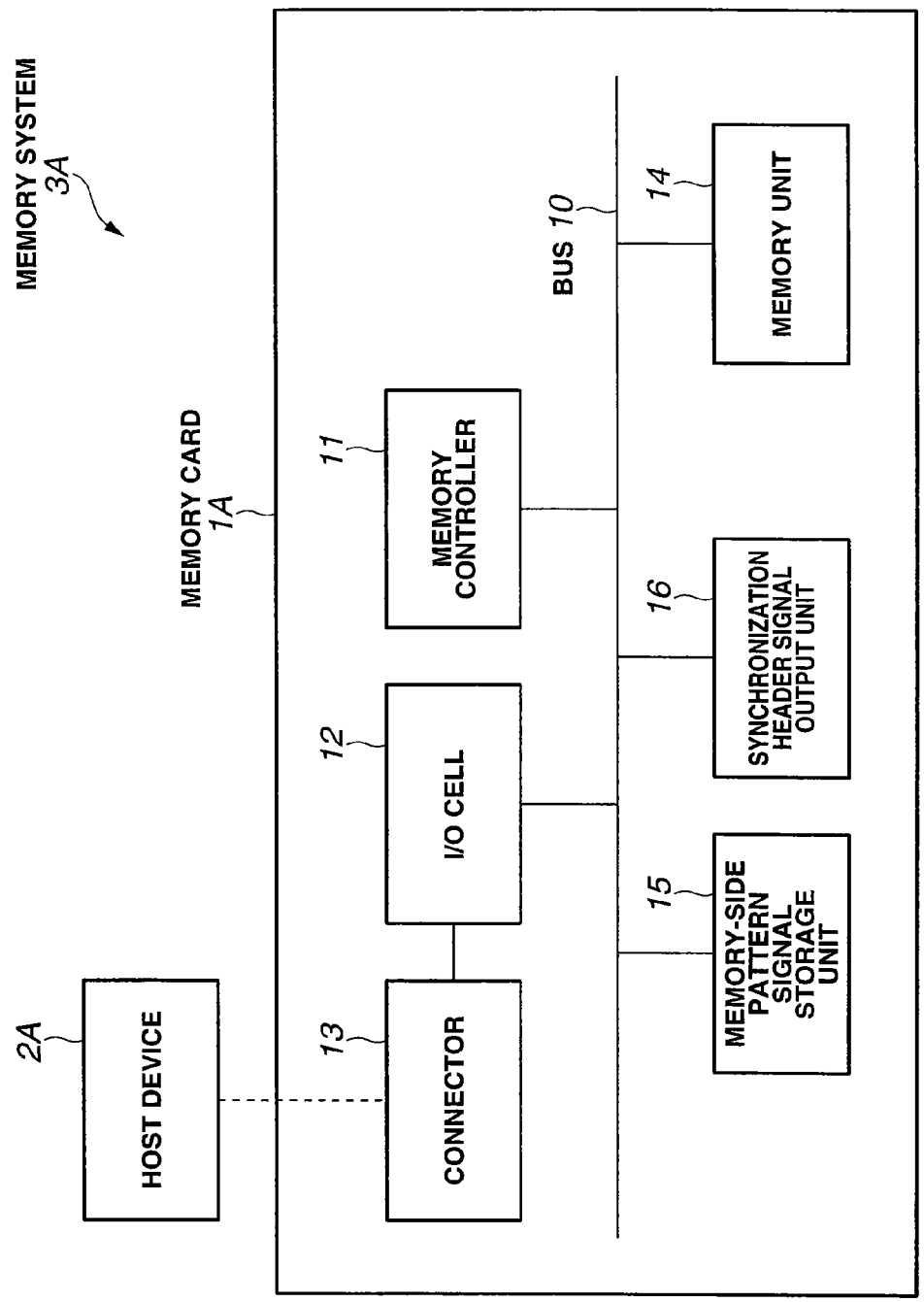
FIG. 7 is a block diagram illustrating a configuration of a memory card according to a second embodiment.
Figure 8:
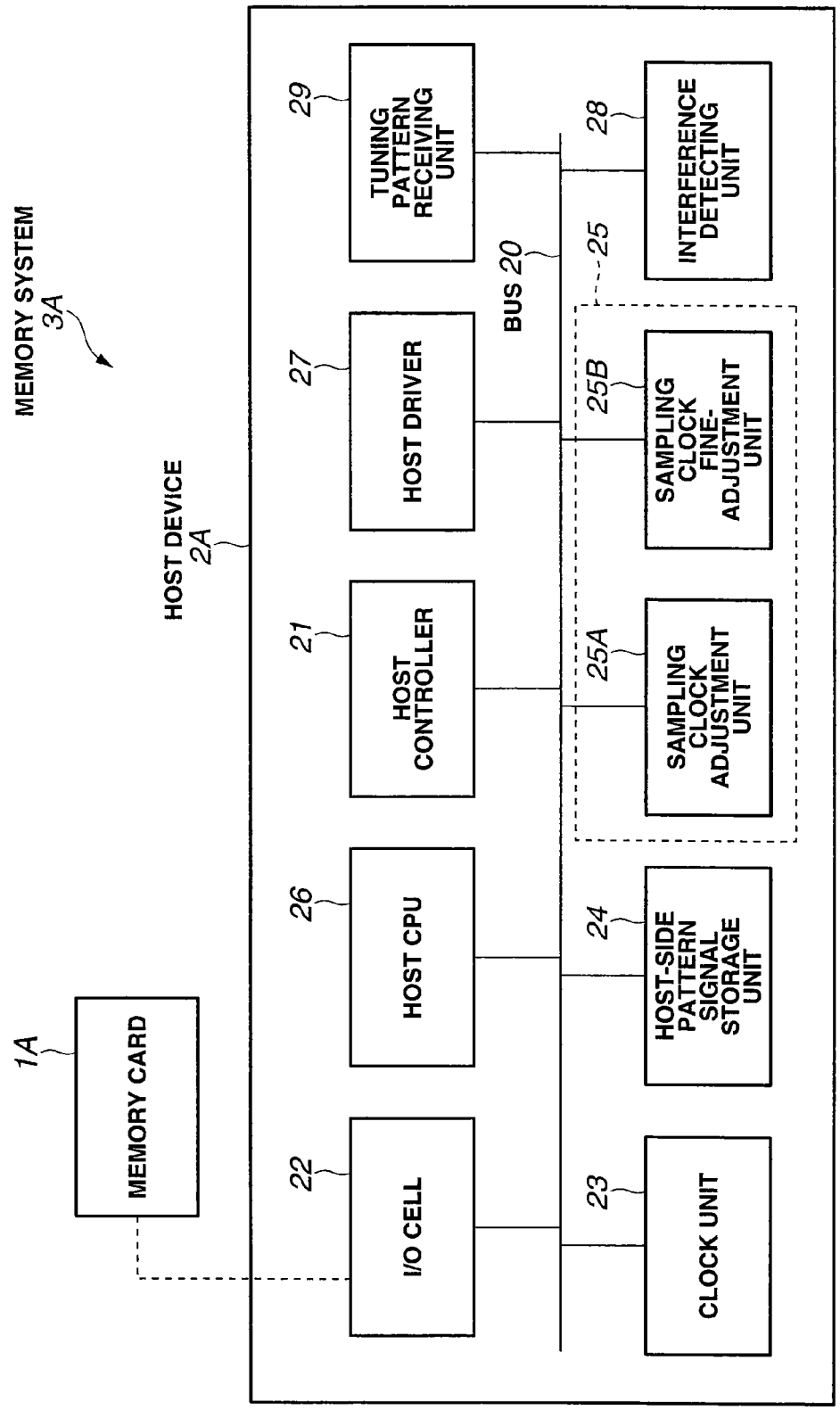
FIG. 8 is a block diagram illustrating a configuration of a host device according to the second embodiment.

As shown in FIG. 7, the memory card 1A of a memory system 3A of the second embodiment includes a synchronization header signal output unit 16 configured to output a synchronization header signal to be added to a data signal, a response signal, and a status signal to be transmitted to the host device 2A. The synchronization header signal output unit 16 may be a part of a memory controller 11 or other component, rather than a separate component. As shown in FIG. 8, the host device 2A in the memory system 3A of the second embodiment includes a sampling clock adjustment unit 25 including a sampling clock fine-adjustment unit 25B for fine-adjusting the phase of a sampling clock signal on the basis of the synchronization header signal.

In the memory system 3 of the first embodiment, tuning pattern signals are used to adjust the sampling clock during startup of the system, thereby achieving fast transfer. However, read delay time can vary due to a temperature change or a voltage fluctuation after startup of the memory system. As a result, the optimum sampling point and the phase of the sampling clock can change with respect to each other with time.

In the memory system 3A of the second embodiment, the sampling clock fine-adjustment unit 25B of the host device 2A fine-adjusts a sampling clock on the basis of the synchronization header signal output from the synchronization header signal output unit 16 of the memory card 1A. Unlike a tuning pattern signal, the synchronization header signal is short data, for example 4-bit data. Accordingly, addition of the synchronization header signal to data to be transmitted does not decrease the transfer rate. When data having a relatively long data length is transmitted, transmission of the data needs to be interrupted in order to perform tuning. The use of the synchronization header signal to perform tuning eliminates the need for the interruption. Therefore data having a long data length can be transmitted without interruption. In the memory system 3A, tuning pattern signals are used to adjust the sampling clock during startup of the memory system 3A and, after that, the synchronization header signal is used to fine-adjust the sampling clock in real time.

The synchronization header signal output unit 16 may output a pre-stored synchronization header signal or generate a synchronization header signal and output the generated synchronization header signal. The synchronization header signal is preferably a 4-bit signal consisting of data "0101" because of the short data length and having a minimal capability for synchronization.

Figure 9:
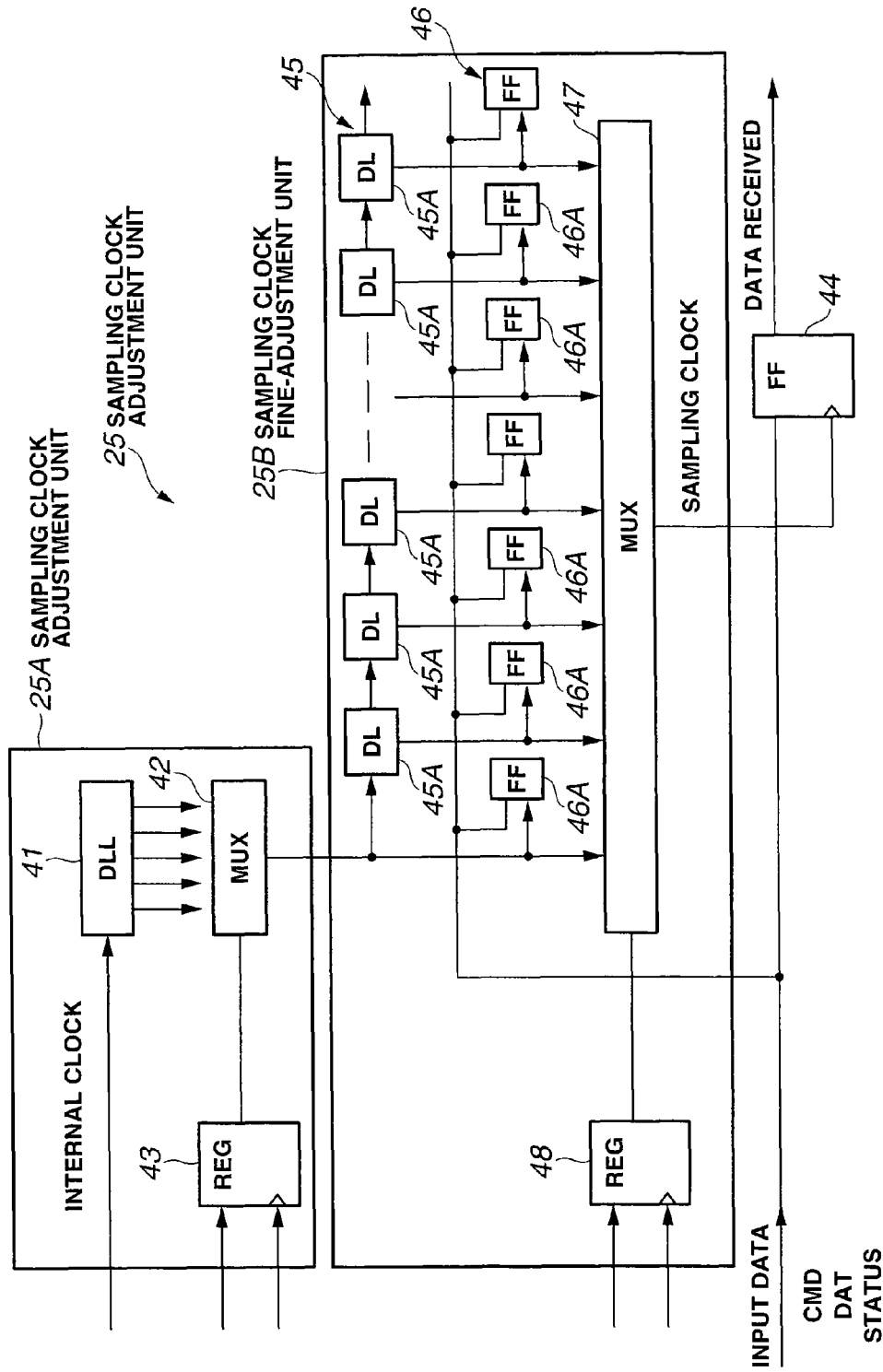
FIG. 9 is a block diagram illustrating a configuration of a sampling clock fine-adjustment unit of the host device according to the second embodiment.

A configuration of the sampling clock adjustment unit 25 will be described with reference to FIG. 9. The sampling clock adjustment unit 25 includes a sampling clock adjustment unit 25A and a sampling clock fine-adjustment unit 25B. The sampling clock adjustment unit 25A is the same as the sampling clock adjustment unit 25 of the host device 2 of the first embodiment. The sampling clock adjustment unit 25A includes a DLL 41, a multiplexer 42, and a register 43. The DLL 41 has a plurality of taps that are out of phase with each other and adjusts the phase of a clock signal input from a clock circuit, or, in other words, generates a sampling clock that is out of phase with the clock signal by a certain degree. The multiplexer 42 selects one of the plurality of phase taps of the DLL 41. The register 43 stores the phase tap position selected by the multiplexer 42.

The sampling clock fine-adjustment unit 25B includes a delay line set 45, a flip-flop (hereinafter abbreviated as "FF") set 46, a multiplexer 47, and a register 48. The delay line set 45 includes a plurality of delay lines 45A which fine-adjust the sampling clock and generate a sampling clock that is out of phase with the original sampling clock by a slighter delay. The FF set 46 includes a plurality of FFs 46A which take and hold data in synchronization with oversampling clocks generated through the delay lines 45A. The multiplexer 47 selects one of a plurality of oversampling clocks. The register 48 stores a tap position selected as a sampling clock from among the oversampling clocks. An FF 44 holds the result of sampling of input data.

The memory card 1A which is a memory device, the host device 2A, and the method for adjusting the sampling clock of the host device 2A according to the second embodiment of the present invention will be described with reference to FIGS. 10 through 14.

Figure 10:
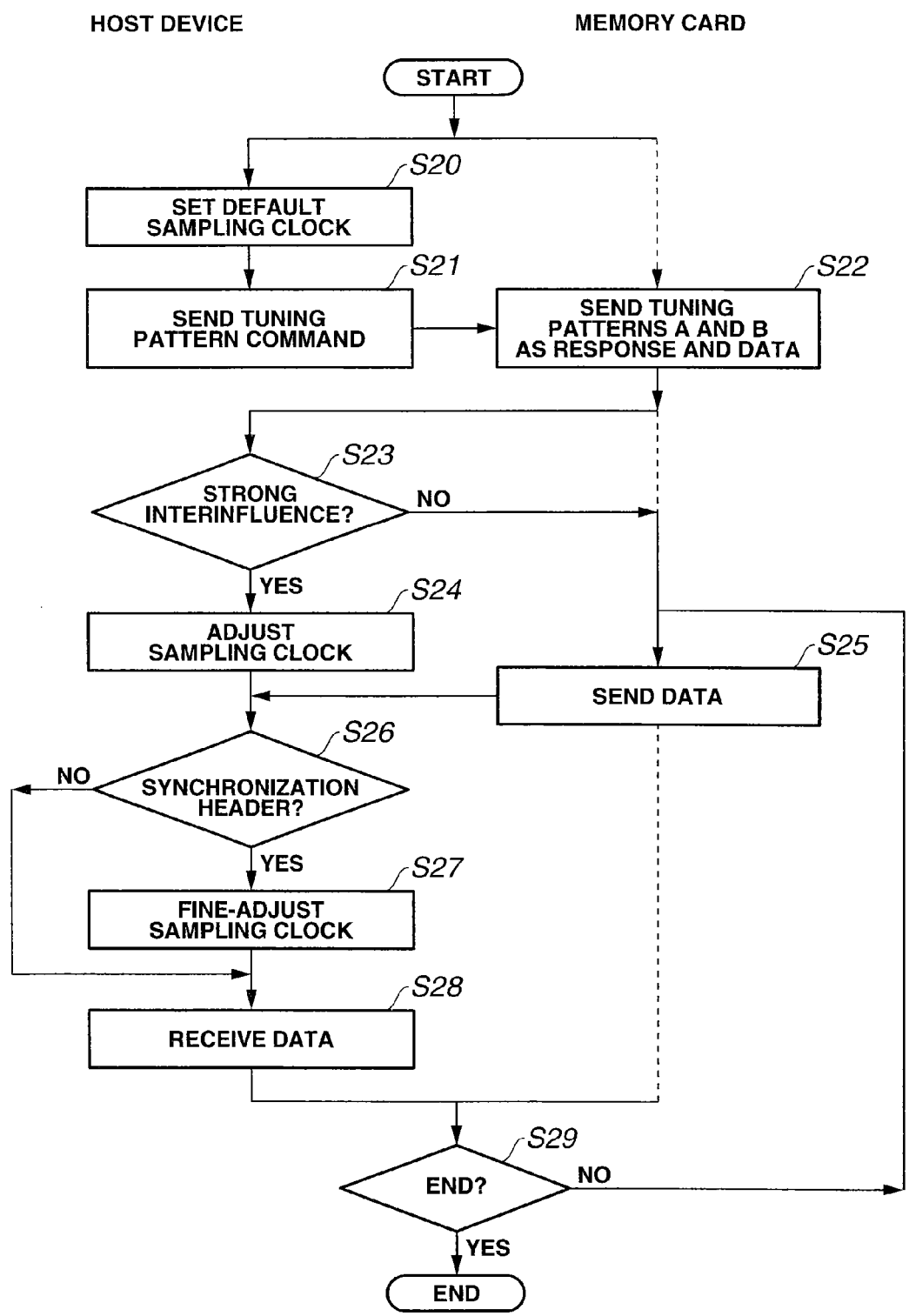
FIG. 10 is a flowchart illustrating a process flow of a sampling clock adjusting method according to the second embodiment.

The method will be described with respect to the flowchart of FIG. 10.

<Steps S20 Through S24>

Steps S20 through S24 are the same as steps S10 through S14 in the memory system 3 of the first embodiment and therefore the description of which will be omitted here.

<Step S25> Sending Step

Figure 12:
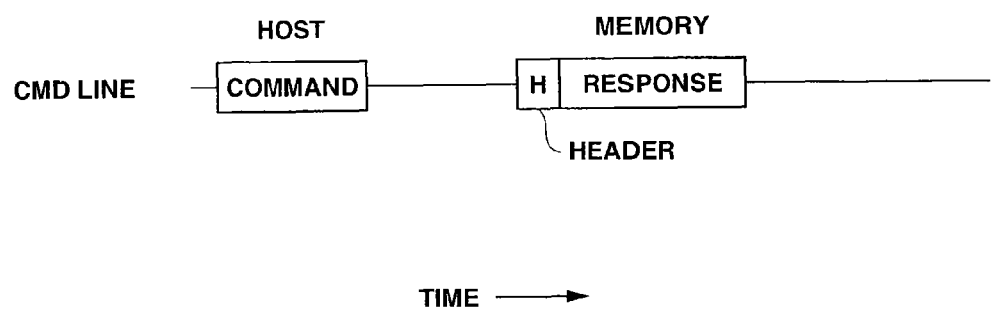
FIG. 12 is a timing chart of the sampling clock adjusting method according to the second embodiment.
Figure 13:
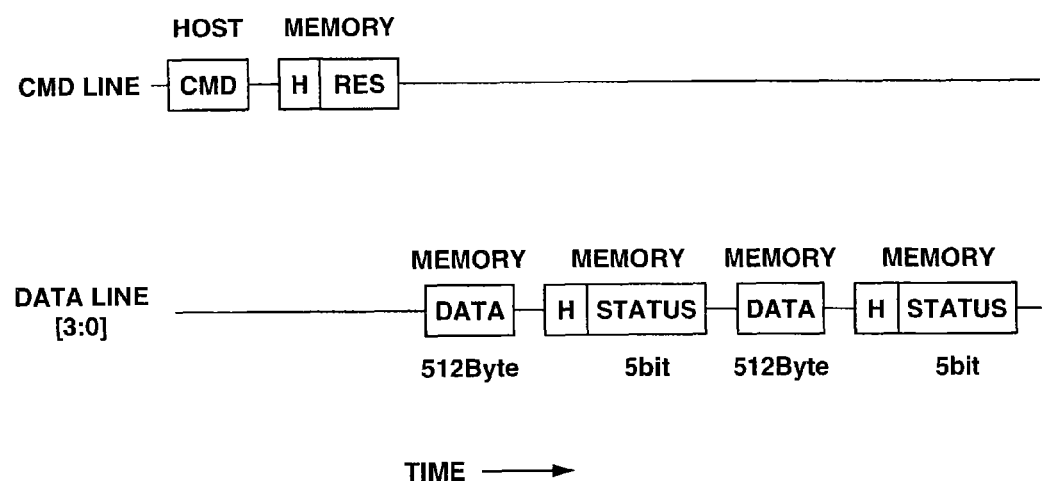
FIG. 13 is a timing chart of the sampling clock adjusting method according to the second embodiment.
Figure 14:
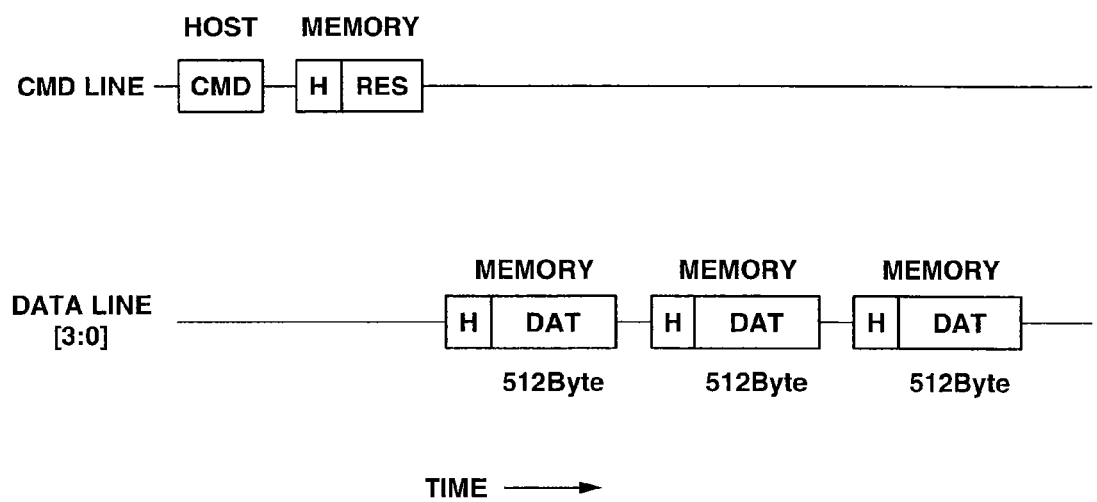
FIG. 14 is a timing chart of the sampling clock adjusting method according to the second embodiment.

In the memory system 3A, a synchronization header signal parameter H is added to a tuning pattern command as illustrated in FIG. 6. When the synchronization header signal parameter H is on, the memory card 1A adds a synchronization header signal output from the synchronization header signal output unit 16 to a response signal, a status (CRC Status) signal, and a data (read data block) signal as shown in FIGS. 12 through 14 to be sent. In a memory system including a plurality of data lines, the memory card 1A preferably adds the synchronization header to all signals to be output onto the data lines.

<Step S26> Synchronization Header Signal Checking Step

The host device 2A checks a signal received from the memory card 1 to determine if a synchronization header signal is added to the signal.

<Step S27> Sampling Clock Fine-Adjusting Step

When the synchronization header signal is added to the signal received from the memory card 1 (Yes at S26), the sampling clock fine-adjustment unit 25B fine-adjusts the sampling clock.

Figure 11:
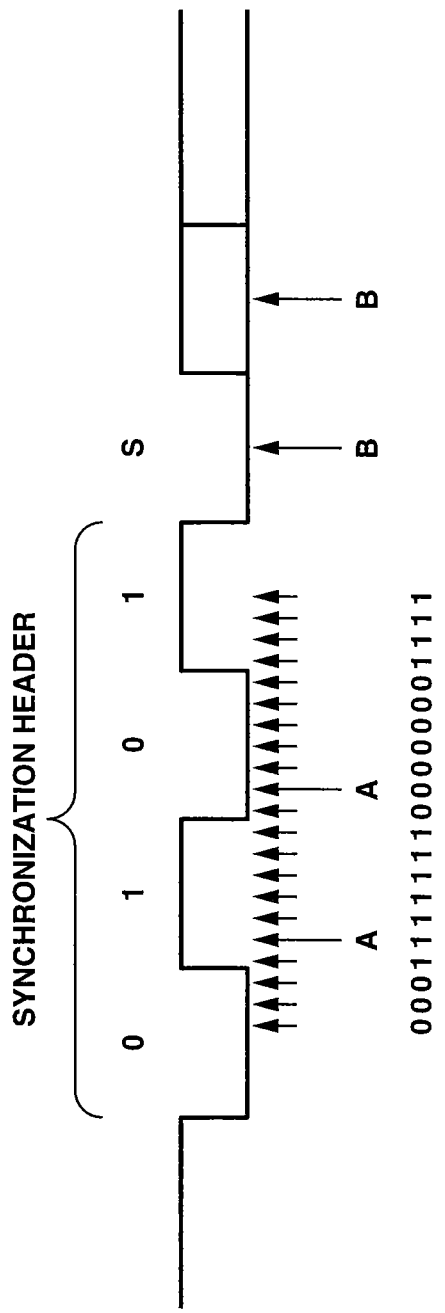
FIG. 11 is an explanatory diagram for explaining the sampling clock adjusting method according to the second embodiment.

In the timing chart shown in FIG. 11, the sampling clock positions are at positions A, which are displaced anteriorly with respect to the data. The sampling clock fine-adjustment unit 25B detects the first 0 of the synchronization header signal and oversamples the data by using many taps indicated by the arrows in FIG. 11. The sampling clock fine-adjustment unit 25B starts oversampling the data slightly before sampling position A. In FIG. 11, the data is oversampled across two bits. Since it is best to sample data at its center, sampling positions B are optimum sampling positions, which can be determined from the result of the oversampling. The sampling clock fine-adjustment unit 25B fine-adjusts the phase of the sampling clock to change the data sampling positions to positions B and stores the data sampling positions in register 48. That is, the sampling clock fine-adjustment unit 25B selects positions located as centrally as possible both at the high and low levels of the data as data sampling positions.

FIGS. 15A and 15B are diagrams for explaining how oversampling is performed in the memory card 1 of the second embodiment when a clock frequency is changed. When the clock frequency shown in FIG. 15A halves as shown in FIG. 15B, the sampling intervals are doubled to keep the number of samples constant. That is, the host device changes the sampling intervals according to the frequency being used.

In the memory system 3A of the second embodiment, the synchronization header signal is added to each unit of transmitted from the memory card to the host device. Specifically, the synchronization header signal is added to a response, a CRC Status, and a read data block. The host device 2A takes data at data sampling position B until it receives a next synchronization header signal. When the host device 2A receives the next synchronization header signal, the host device 2A fine-adjusts the sampling clock again.

As has been stated earlier, the addition of the synchronization header signal to transmission data is turned on and off by a command.

As has been described above, the memory card 1A in the memory system 3A adds the synchronization header signal to each unit of information to be transmitted to the host device 2A. Therefore, the sampling clock can be fine-adjusted in real time even when read delay time varies. Therefore, the memory card 1A and the host device 2A are capable of more stable fast data transmission than the memory card 1 and the host device 2 of the first embodiment. In addition, the memory card 1A can be designed more simply because the memory card 1A allows variations in data delay time. Furthermore, the sampling clock can be corrected in real time by using hardware and therefore long continuous data transmission can be performed.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A memory device comprising:
   a nonvolatile semiconductor memory unit;
   a memory controller configured to perform control to receive a command signal, to send a response signal, and to send and receive a data signal, and a status signal in synchronization with a clock signal, wherein the memory controller controls receiving of the command signal and sending of the response signal through a command line from and to a host device to which the memory device is connected, controls sending and receiving of the data signal and the status signal through a data line to and from the host device, and controls receiving of the clock signal through a clock line from the host device; and
   a memory-side pattern signal storage unit configured to store first and second tuning pattern signals to be sent to the host device, the first and second tuning pattern signals being used by the host device to adjust a phase of the clock signal for use as a sampling clock signal;

wherein:

the first and second tuning pattern signals are pre-stored also in the host device; and the memory controller sends to the host device the first tuning pattern signal and the second tuning pattern signal, and a time period during which the first tuning pattern signal is sent and a time period during which the second tuning pattern signal is sent overlap each other.

2. The memory device according to claim 1, wherein the first tuning pattern signal and the second tuning pattern signal each includes a CRC code.

3. The memory device according to claim 2, wherein the first and second tuning pattern signals enable detection of interference between lines.

4. The memory device according to claim 3, wherein the memory-side pattern signal storage unit stores a plurality of tuning pattern signal sets, each including the first and second tuning pattern signals and being pre-stored also in the host device, and one of the plurality of tuning pattern signal sets is selected and sent to the host device in response to a command from the host device.

5. The memory device according to claim 4, further comprising a synchronization header signal output unit configured to output a synchronization header signal to be added to the data signal, the response signal, and the status signal and sent to the host device for the host device to fine-adjust a phase of the sampling clock signal.

6. The memory device according to claim 5, wherein the synchronization header signal is a 4-bit signal including data "0101".

7. The memory device according to claim 6, wherein the memory controller sends the first and second tuning pattern signals as the response signal and the data signal in response to receipt of a tuning command as the command signal from the host device.

8. The memory device according to claim 7, wherein the nonvolatile semiconductor memory unit is a NAND flash memory unit.

9. The memory device according to claim 8, which is a memory card.

10. A host device comprising:

a clock configured to generate a clock signal;

a host controller configured to perform control to send a command signal and a data signal in synchronization with the clock signal to a memory device including a nonvolatile semiconductor memory unit and being connected to the host device and to receive from the memory device a response signal, a data signal, and a status signal in synchronization with a sampling clock signal, the sampling clock signal being the clock signal whose phase is adjusted, wherein the host controller controls sending of the command signal and receiving of the response signal through a command line, controls sending and receiving of the data signal through a data line, controls receiving of the status signal through a data line, and controls sending of the clock signal through a clock line;

a sampling clock adjustment unit configured to adjust a phase of the sampling clock signal; and a host-side pattern signal storage unit configured to pre-store first and second tuning pattern signals that are pre-stored also in the memory device and sent from the memory device for adjusting the phase of the sampling clock signal;

the host device further comprising:

an interference detecting unit configured to compare the first tuning pattern signal received from the memory device and the second tuning pattern signal received from the memory device in a time period overlapping a time period during which the first tuning pattern signal is received with the first and second tuning pattern signals pre-stored in the host-side pattern signal storage unit to detect whether there is a difference;

wherein the sampling clock adjustment unit adjusts the phase of the sampling clock based on a detection result by the interference detecting unit.

11. The host device according to claim 10, wherein the first tuning pattern signal and the second tuning pattern signal each includes a CRC code.

12. The host device according to claim 11, wherein the host-side pattern signal storage unit stores a plurality of tuning pattern signal sets, each including the first and second tuning pattern signals and pre-stored also in the memory device, and an instruction as to which of the plurality of tuning pattern signals sets is to be used is sent to the memory device with the command signal.

13. The host device according to claim 12, further comprising a sampling clock fine-adjustment unit configured to fine-adjust the phase of the sampling clock signal on the basis of a synchronization header signal added to the data signal or the command signal received from the memory device.

14. The host device according to claim 13, wherein the nonvolatile semiconductor memory unit of the memory device is a NAND flash memory unit.

15. The host device according to claim 14, wherein the memory device is a memory card.

* * * * *